(12) United States Patent
Lustiger

(10) Patent No.: US 8,211,341 B2
(45) Date of Patent: Jul. 3, 2012

(54) FIBER PELLETS METHOD OF MAKING, AND USE IN MAKING FIBER REINFORCED POLYPROPYLENE COMPOSITES

(75) Inventor: Arnold Lustiger, Edison, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 581 days.

(21) Appl. No.: 12/291,897

(22) Filed: Nov. 14, 2008

(65) Prior Publication Data
US 2009/0130443 A1 May 21, 2009

Related U.S. Application Data

(60) Provisional application No. 61/003,442, filed on Nov. 16, 2007.

(51) Int. Cl.
*B29B 9/06* (2006.01)
*D01D 5/30* (2006.01)

(52) U.S. Cl. ....... 264/118; 264/40.5; 264/123; 264/141; 264/142; 264/143; 264/148; 264/172.11; 264/211; 425/331; 425/365; 425/382 R; 428/364; 428/392; 428/394; 428/401; 524/277

(58) Field of Classification Search .......... None
See application file for complete search history.

(56) References Cited

U.S. PATENT DOCUMENTS 5,145,892 A * 9/1992 Yasukawa et al. ........... 524/34
5,185,117 A * 2/1993 Hawley .................. 264/211.12

(Continued)

FOREIGN PATENT DOCUMENTS

JP 62204908 * 9/1987

OTHER PUBLICATIONS

U.S. Appl. No. 11/301,533, ExxonMobil Research & Eng, filed Dec. 13, 2005.

(Continued)

*Primary Examiner* — Jeffrey Wollschlager
(74) *Attorney, Agent, or Firm* — Robert A. Migliorini

(57) ABSTRACT

The present disclosure is directed generally to synthetic organic fiber pellets, methods for making such pellets, and methods of using such pellets for making fiber reinforced polypropylene composite resins. The synthetic organic fiber pellets include at least 80 wt % of a synthetic organic fiber chosen from polyalkylene terephthalates, polyalkylene naphthalates, polyamides, polyolefins, polyacrylonitrile, and combinations thereof, and from 2 to 20 wt % of one or more waxes. The synthetic organic fiber pellets are produced using a pelleting press process. Also provided is a method for making fiber reinforced polypropylene composite pellets including feeding into a compounding extruder at least 25 wt % polypropylene based polymer, from 5 to 60 wt % of synthetic organic fiber in the form of the synthetic organic fiber pellets, and from 0 to 60 wt % inorganic filler; extruding the polypropylene based resin, the fiber pellets, and the inorganic filler through the compounding extruder to form a fiber reinforced polypropylene composite melt; cooling the fiber reinforced polypropylene composite melt to form a solid fiber reinforced polypropylene composite; and pelletizing the solid fiber reinforced polypropylene composite to form fiber reinforced polypropylene composite pellets; wherein an article molded from the composite pellets has a flexural modulus of at least 2.07 GPa and exhibits ductility during instrumented impact testing. Articles molded from the fiber reinforced polypropylene composite pellets find application as automotive parts, household appliance parts, or boat hulls.

26 Claims, 6 Drawing Sheets

Process For Making Fiber Reinforced Polypropylene Composites

U.S. PATENT DOCUMENTS

| | | | | |
|---|---|---|---|---|
| 5,498,478 | A * | 3/1996 | Hansen et al. | 428/372 |
| 5,935,508 | A * | 8/1999 | Fernyhough et al. | 264/495 |
| 6,270,883 | B1 | 8/2001 | Sears et al. | |
| 6,752,336 | B1 | 6/2004 | Wingard | |
| 6,883,668 | B1 | 4/2005 | Lindsey et al. | |
| 2004/0159413 | A1 | 8/2004 | Taylor et al. | |
| 2004/0220325 | A1 * | 11/2004 | Kitano et al. | 524/543 |
| 2005/0198742 | A1 | 9/2005 | Berard et al. | |
| 2006/0261509 | A1 * | 11/2006 | Lustiger et al. | 264/143 |
| 2009/0092833 | A1 * | 4/2009 | Schmitt et al. | 428/378 |

OTHER PUBLICATIONS

U.S. Appl. No. 11/318,363, ExxonMobil Research & Eng, filed Dec. 23, 2005.

U.S. Appl. No. 11/395,493, ExxonMobil Research & Eng, filed Mar. 31, 2006.

U.S. Appl. No. 11/435,579, ExxonMobil Research & Eng, filed May 17, 2006.

U.S. Appl. No. 60/906,041, ExxonMobil Research & Eng, filed Mar. 9, 2007.

U.S. Appl. No. 60/921,021, ExxonMobil Research & Eng, filed Mar. 30, 2007.

"Flat Die Pelleting Presses", Amandus Kahl GmbH & Co., KG Sales Literature.

"Kahl Pellet Mills", LCI Corp. Sales Literature.

"Process Technology for Economic Compacting by Means of Pelleting", Amandus Kahl GmbH & Co., KG Sales Literature.

"Kahl Flat die Pelleting Presses are Robust and Powerful", Amandus Kahl website, http://www.akahl.de/index.php?hid=10&id=63, Sales Literature.

Schut, Jan H., "Purified Cellulose Fibers Show Promise in Reinforced Thermoplastics", Plastics Technology (PTonline.com), Gardner Publications, Inc.

* cited by examiner

Pelleting Press for Making Synthetic Organic Fiber Pellets

Feeder For Feeding Organic Fiber Pellets That Includes A Single Conditioning Auger/Agitator And A Metering Auger

FIBER PELLETS METHOD OF MAKING, AND USE IN MAKING FIBER REINFORCED POLYPROPYLENE COMPOSITES

CROSS-REFERENCE TO RELATED APPLICATIONS

This is a Non-Provisional Application that claims priority to U.S. Provisional Application 61/003,442 filed Nov. 16, 2007, which is herein incorporated by reference.

FIELD

The present disclosure is directed generally to synthetic organic fiber pellets, methods of making such pellets, and the use of such pellets in making fiber reinforced polypropylene compositions. More particularly, the present disclosure relates to PET fiber pellets, methods of making PET fiber pellets and the use of PET fiber pellets in making fiber reinforced polypropylene compositions, and articles made from such compositions having a flexural modulus of at least 300,000 psi and exhibiting ductility during instrumented impact testing.

BACKGROUND

Polyolefins have limited use in engineering applications due to the tradeoff between toughness and stiffness. For example, polyethylene is widely regarded as being relatively tough, but low in stiffness. Polypropylene generally displays the opposite trend, i.e., is relatively stiff, but low in toughness.

Several well known polypropylene compositions have been introduced which address toughness. For example, it is known to increase the toughness of polypropylene by adding rubber particles, either in-reactor resulting in impact copolymers, or through post-reactor blending. However, while toughness is improved, the stiffness is considerably reduced using this approach.

Glass reinforced polypropylene compositions have been introduced to improve stiffness. However, the glass fibers have a tendency to break in typical injection molding equipment, resulting in reduced toughness and stiffness. In addition, glass reinforced products have a tendency to warp after injection molding.

Another known method of improving physical properties of polyolefins is synthetic organic fiber reinforcement. For example, EP Patent Application 0397881, the entire disclosure of which is hereby incorporated herein by reference, discloses a composition produced by melt-mixing 100 parts by weight of a polypropylene resin and 10 to 100 parts by weight of polyester fibers having a fiber diameter of 1 to 10 deniers, a fiber length of 0.5 to 50 mm and a fiber strength of 5 to 13 g/d, and then molding the resulting mixture. Also, U.S. Pat. No. 3,639,424 to Gray, Jr. et al., the entire disclosure of which is hereby incorporated herein by reference, discloses a composition including a polymer, such as polypropylene, and uniformly dispersed therein at least about 10% by weight of the composition staple length fiber, the fiber being of manmade polymers, such as poly(ethylene terephthalate) or poly (1,4-cyclohexylenedimethylene terephthalate).

Fiber reinforced polypropylene compositions are also disclosed in PCT Publication WO02/053629, the entire disclosure of which is hereby incorporated herein by reference. More specifically, WO02/053629 discloses a polymeric compound, comprising a thermoplastic matrix having a high flow during melt processing and polymeric fibers having lengths of from 0.1 mm to 50 mm. The polymeric compound comprises between 0.5 wt % and 10 wt % of a lubricant.

Consistently feeding pre-cut synthetic organic fibers into a compounding extruder is an issue encountered during the production of fiber reinforced polypropylene composites. Pre-cut synthetic organic fiber, due to its low bulk density and tendency to entangle, is difficult to feed consistently into polymer compounding equipment. Gravimetric or volumetric type screw or auger feeders are used in the metering and conveying of polymers, fillers and additives into the extrusion compounding process. These feeders are designed to convey materials at a constant rate using a single or twin screw type of auger mechanism by measuring the weight loss in the hopper of the feeder or the volume of additive fed to the compounding extruder. These feeders are effective in conveying pellets or powder, but are generally not effective in conveying cut synthetic organic fiber. Two issues are generally encountered with traditional gravimetric or volumetric additive feeders when feeding cut organic fiber.

The first issue is that the cut fiber tends to bridge in the feed throat leading from the feeder hopper to the feeder metering auger or screw. This results in a non-uniform rate of fiber feeding the feeder screw or auger, which necessarily results in an inconsistent fiber feed rate to the compounding process. More particularly, at certain times, fiber gets hung up in the feeder throat area and little fiber is conveyed by the feeder, while at other times, an overabundance of fiber is conveyed to the compounding extruder. FIG. 1 is an illustrative plot of the feed rate of ¼ inch chopped polyester fiber through a typical single screw type gravimetric feeder (prior art). The feed rate may vary anywhere from 3 to 18 grams per 5 seconds of feeding. This inconsistency is less than adequate to produce a fiber reinforced polypropylene in an extruder with a consistent percentage of fiber incorporated into the polypropylene based resin.

A second issue encountered with typical gravimetric or volumetric additive feeders is that the pre-cut fiber has a tendency to clump at the end of the screw type auger of the feeder resulting in the fiber dropping in large clumps into the compounding extruder. These large pre-cut fiber clumps result in fiber feed rate inconsistency to the compounding extruder. This makes dispersion of the organic fiber into the polypropylene matrix more difficult because of the greater work the compounding extruder must do to uniformly disperse the organic fiber. It may also lead to variations in the fiber loading in the polypropylene composite as a function of time, which correspondingly may result in a variation in properties of the resultant articles molded from the composite pellets.

A need exists for improved form of synthetic organic fiber to more easily facilitate the feeding of the fiber into a compounding extruder for making fiber reinforced polypropylene composites. More particularly, a need exists for improved methods of feeding synthetic organic fiber into the polypropylene based resin during the compounding process while still maintaining the advantageous effects of the fiber on impact resistance and flexural modulus of parts molded from the composite resin pellets.

SUMMARY

Provided are compositions of matter for synthetic organic fiber pellets, methods of making such pellets, and the use of such pellets in making fiber reinforced polypropylene based composites with improved feeding of the organic fiber into a compounding extruder.

In one aspect of the present disclosure, provided are synthetic organic fiber pellets comprising at least 80 wt % of a synthetic organic fiber chosen from polyalkylene terephthalates, polyalkylene naphthalates, polyamides, polyolefins, polyacrylonitrile, and combinations thereof, and from 2 to 20 wt % of one or more waxes.

In another aspect of the present disclosure, provided is a method for producing synthetic organic fiber pellets comprising: providing a pelleting press; feeding to the pelleting press a fiber-wax mixture including at least 80 wt % of a pre-cut synthetic organic fiber chosen from polyalkylene terephthalates, polyalkylene naphthalates, polyamides, polyolefins, polyacrylonitrile, and combinations thereof, and from 2 to 20 wt % of one or more waxes; forcing the fiber-wax mixture through a die to form synthetic organic fiber strands; and cutting the synthetic organic fiber strands into synthetic organic fiber pellets.

In yet another aspect of the present disclosure, provided is a method for making fiber reinforced polypropylene composite pellets comprising: feeding into a compounding extruder at least 25 wt % polypropylene based polymer, from 5 to 60 wt % of synthetic organic fiber in the form of synthetic organic fiber pellets, and from 0 to 60 wt % inorganic filler, based on the total weight of the composition; extruding the polypropylene based resin, the fiber pellets, and the inorganic filler through the compounding extruder to form a fiber reinforced polypropylene composite melt; cooling the fiber reinforced polypropylene composite melt to form a solid fiber reinforced polypropylene composite; and pelletizing the solid fiber reinforced polypropylene composite to form fiber reinforced polypropylene composite pellets; wherein the synthetic organic fiber pellets comprise at least 80 wt % of synthetic organic fiber chosen from polyalkylene terephthalates, polyalkylene naphthalates, polyamides, polyolefins, polyacrylonitrile, and combinations thereof, and from 2 to 20 wt % of one or more waxes; and wherein an article molded from the composite pellets has a flexural modulus of at least 2.07 GPa and exhibits ductility during instrumented impact testing.

Numerous advantages result from the synthetic organic fiber pellets, methods of making the synthetic organic fiber pellets and use of the synthetic organic fiber pellets in making the fiber reinforced polypropylene composite pellets disclosed herein and the uses/applications therefore.

For example, in exemplary forms disclosed herein, the methods of making the fiber reinforced polypropylene composite pellets using synthetic organic fiber pellets exhibit higher feed rates into a compounding extruder than feeding continuous fiber from spools or chopped fiber from a feeder.

In a further exemplary form disclosed herein, the methods of making the fiber reinforced polypropylene composite pellets using synthetic organic fiber pellets exhibit improved feed rate consistency of organic fiber into the compounding extruder.

In a further exemplary form disclosed herein, the methods of making the fiber reinforced polypropylene composite pellets using synthetic organic fiber pellets exhibit uniform dispersion of the synthetic organic fiber in the composite pellets and in articles molded from the pellets.

In a further exemplary form disclosed herein, the methods of making the fiber reinforced polypropylene composite pellets using synthetic organic fiber pellets do not exhibit bridging in the fiber feed hopper throat prior to being fed into the compounding extruder.

In a further exemplary form disclosed herein, the methods of making the fiber reinforced polypropylene composite pellets using synthetic organic fiber pellets exhibit no clumping of the fiber at the end of the feeder screw before falling into the compounding extruder.

In a further exemplary form disclosed herein, the methods of making the fiber reinforced polypropylene composite pellets using synthetic organic fiber pellets result in molded articles that do not splinter during instrumented impact testing.

In yet a further exemplary form of the present disclosure, the methods of making the fiber reinforced polypropylene composite pellets using synthetic organic fiber pellets result in molded articles that exhibit fiber pull out during instrumented impact testing without the need for lubricant additives.

In yet a further exemplary form of the present disclosure, the methods of making the fiber reinforced polypropylene composite pellets using synthetic organic fiber pellets result in molded articles that exhibit a higher heat distortion temperature compared to rubber toughened polypropylene.

In yet a further exemplary form of the present disclosure, the methods of making the fiber reinforced polypropylene composite pellets using synthetic organic fiber pellets result in molded articles that exhibit a lower flow and cross flow coefficient of linear thermal expansion compared to rubber toughened polypropylene.

In still yet a further exemplary form of the present disclosure, the methods of making the fiber reinforced polypropylene composite pellets using synthetic organic fiber pellets result in molded articles that exhibit a flexural modulus of at least 300,000 psi.

In still yet a further exemplary form of the present disclosure, the methods of making the fiber reinforced polypropylene composite pellets using synthetic organic fiber pellets result in molded articles that are particularly suitable for household appliances, automotive parts, and boat hulls.

These and other features and attributes of the disclosed synthetic organic fiber pellets, methods of making such pellets, and use of such pellets in making fiber reinforced polypropylene composite resins and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
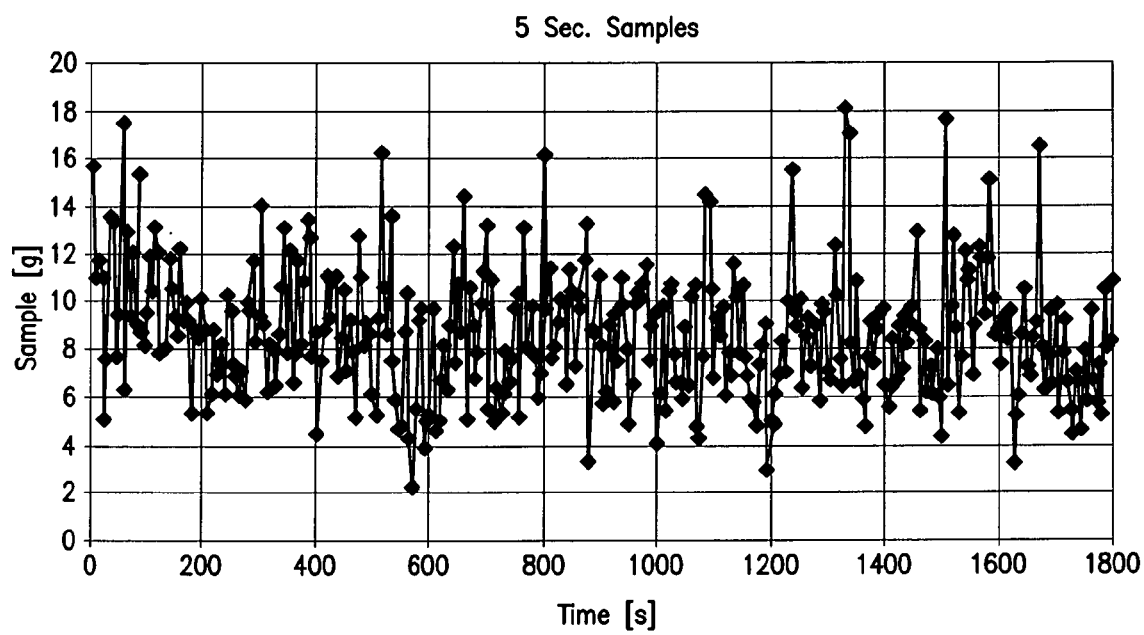
FIG. 1 depicts the feed rate through a typical gravimetric feeder when feeding chopped ¼ inch PET fiber (prior art method).

Disclosed herein are synthetic organic fiber pellet compositions, methods of making such synthetic organic fiber pellets, and methods for making fiber reinforced polypropylene based composite pellets by using such synthetic organic fiber pellets. Reference is now made to FIGS. 2-6, wherein like numerals are used to designate like parts throughout. All numerical values within the detailed description and the claims herein are understood as modified by "about."

The present disclosure relates to synthetic organic fiber pellets and methods of making such pellets. The synthetic organic fiber pellets include a synthetic organic polymeric fiber and a wax. The present disclosure relates to improved methods for making fiber reinforced polypropylene composite resin pellets using the synthetic organic fiber pellets as a starting material. The methods of making fiber reinforced polypropylene resin pellets of the present disclosure are distinguishable over the prior art in comprising a combination of a polypropylene based matrix with synthetic organic fiber and optional inorganic filler, wherein the fiber is fed into the compounding extruder in the form of a fiber pellet. The fiber reinforced polypropylene resin pellets yield articles molded from the pellets with a flexural modulus of at least 300,000 psi and ductility during instrumented impact testing (15 mph, −29° C., 25 lbs). The fiber reinforced polypropylene compositions of the present disclosure also comprise a polypropylene based matrix polymer with an advantageous high melt flow rate without sacrificing impact resistance and that do not splinter during instrumented impact testing.

U.S. patent application Ser. No. 11/301,533 filed on Dec. 13, 2005, herein incorporated by reference in its entirety, discloses advantageous fiber reinforced polypropylene compositions. The fiber reinforced polypropylene compositions include at least 25 wt % polypropylene based polymer, from 5 to 60 wt % synthetic organic fiber, and from 0 to 60 wt % inorganic filler. Articles molded from these fiber reinforced polypropylene compositions have a flexural modulus of at least 300,000 psi, and exhibit ductility during instrumented impact testing.

U.S. patent application Ser. No. 11/318,363 filed on Dec. 23, 2005, herein incorporated by reference in its entirety, discloses advantageous processes for making fiber reinforced polypropylene resins including at least 25 wt % polypropylene based polymer, from 5 to 60 wt % synthetic organic fiber, and from 0 to 60 wt % inorganic filler. The process includes extrusion compounding the polypropylene based polymer, the organic fiber, and the inorganic filler to form pellets, which are subsequently molded to form an article with a flexural modulus of at least 300,000 psi, and that exhibits ductility during instrumented impact testing. The synthetic organic fiber may be fed to the extruder in the form of either chopped fiber or as continuous fiber unwound from spools fed into the hopper of the extrusion compounder.

U.S. patent application Ser. No. 11/395,493 filed on Mar. 31, 2006, herein incorporated by reference in its entirety, discloses cloth-like fiber reinforced polypropylene compositions, and the beneficial mechanical and aesthetic properties imparted by such compositions. The cloth-like fiber reinforced polypropylene compositions include at least 25 wt % polypropylene based polymer, from 5 to 60 wt % synthetic organic reinforcing fiber, from 0 to 60 wt % inorganic filler, and from 0.1 to 2.5 wt % colorant fiber. Articles molded from these fiber reinforced polypropylene compositions have a flexural modulus of at least 300,000 psi, exhibit ductility during instrumented impact testing, and exhibit a cloth-like appearance.

U.S. patent application Ser. No. 11/435,578 filed on May 17, 2006, herein incorporated by reference in its entirety, discloses an in-line compounding and molding process for making fiber reinforced polypropylene composites. The in-line compounding and molding process includes the steps of providing an in-line compounding and molding machine comprising a twin screw extruder fluidly coupled to an injection molder; extrusion compounding in the twin screw extruder a composition comprising at least 30 wt % polypropylene, from 10 to 60 wt % synthetic organic fiber, from 0 to 40 wt % inorganic filler, and from 0 to 0.1 wt % lubricant to form a melt extrudate; conveying the melt extrudate to the injection molder; and molding the melt extrudate in the injection molder to form a part or article.

U.S. Patent Application No. 60/906,041, filed on Mar. 9, 2007, herein incorporated by reference in its entirety, discloses polyester fiber reinforced polypropylene resin pellets and methods for producing therein including at least 25 wt % polypropylene based polymer; from 10 to 40 wt % polyester fiber; from 0 to 60 wt % inorganic filler; and from 0 to 0.2 wt % lubricant. Articles molded from the polyester fiber reinforced polypropylene resin pellets exhibit a drop dart impact resistance that is dependent on the pellet length and whether the PET fiber is incorporated as chopped fiber or continuous fiber during the extrusion compounding process.

U.S. Patent Application No. 60/921,021, filed on Mar. 30, 2007, herein incorporated by reference in its entirety, discloses methods for making fiber reinforced polypropylene composite pellets using pre-cut fiber fed to a compounding extruder by improved fiber feeder systems. One form of the method includes feeding into a compounding extruder at least 25 wt % polypropylene based polymer, from 5 to 60 wt % pre-cut synthetic organic fiber, and from 0 to 60 wt % inorganic filler; and extruding, cooling and pelletizing the resultant mixture of components to form fiber reinforced polypropylene composite pellets; wherein the pre-cut synthetic organic fiber is fed from a feeder including a feeder hopper, one or more conditioning augers/agitators, one or more metering augers below the feeder hopper, and a means for controlling the speed of the conditioning augers/agitators and metering augers; and wherein an article molded from the pellets has a flexural modulus of at least 2.07 GPa and exhibits ductility during instrumented impact testing. In another form, the feeder includes a feeder hopper, two or more counter-rotating metering rollers, one or more separating rollers below the metering rollers, and a means for controlling the speed of the metering rollers and separating rollers. In yet another form, a circle feeder may be used to feed the pre-cut fiber.

Synthetic Organic Fiber Pellets and Method of Making

Novel compositions of matter for synthetic organic fiber pellets are disclosed herein. Synthetic organic fibers referred to herein are fibers that are produced from man-made polymerization processes as distinguished from natural organic fibers, which are products of nature.

The synthetic organic fiber is not particularly restricted and is generally selected from polyalkylene terephthalates, polyalkylene naphthalates, polyamides, polyolefins, polyacrylonitrile, and combinations thereof. In a particular embodiment, the fiber comprises a polymer selected from polyethylene terephthalate (PET), polybutylene terephthalate, polyamide and acrylic. In another embodiment, PET fiber is advantageous in yielding PET fiber pellets and PET fiber reinforced polypropylene composite resins.

In one embodiment, the fiber used in the synthetic organic fiber pellet is a single component fiber. In another embodiment, the fiber used in the synthetic organic fiber pellet is a multicomponent fiber wherein the fiber is formed from a process wherein at least two polymers are extruded from separate extruders and meltblown or spun together to form one fiber. In a particular aspect of this embodiment, the polymers used in the multicomponent fiber are substantially the same. In another particular aspect of this embodiment, the polymers used in the multicomponent fiber are different from each other. The configuration of the multicomponent fiber can be, for example, a sheath/core arrangement, a side-by-side arrangement, a pie arrangement, an islands-in-the-sea arrangement, or a variation thereof. The fiber may also be drawn to enhance mechanical properties via orientation, and subsequently annealed at elevated temperatures, but below the crystalline melting point to reduce shrinkage and improve dimensional stability at elevated temperature.

The length and diameter of the synthetic organic fiber of the present disclosure are not particularly restricted. The length of the cut synthetic organic fiber within the meaning of this disclosure is with respect to the input length of the pre-cut or chopped fiber being fed to pellet press or mill to form a synthetic organic fiber pellet. This is also referred to within the detailed description and the claims of the present disclosure as the "input chopped fiber length" or the "input cut fiber length" or the "pre-cut fiber length." The length of the cut or chopped fiber referred to within the detailed description and the claims is not with respect to the length of the fiber within the fiber pellet after pressing/milling or within the fiber reinforced polypropylene composite resin after compounding. It is understood that during the fiber pelleting process and/or composite extrusion compounding process, the input chopped or cut fiber may undergo further length reduction through these processes. In a particular embodiment, the input cut or chopped synthetic organic fiber fed to the pellet mill may have a length of 6.4 mm, or a length within the range of 3.2 to 25.4 mm, or more particularly a length within the range of 4.8 to 12.7 mm. In another embodiment, the input cut synthetic organic fibers may have a length of 3.2 to 19.1 mm, or 6.4 to 12.7 mm. In another embodiment, the input cut fiber length may be 3.2 mm, or 6.4 mm, or 12.7 mm, or 19.1 mm, or 25.4 mm.

The diameter or denier of the synthetic organic fiber within the meaning of this disclosure is also with respect to the input diameter or denier of the synthetic organic fiber being fed to the pellet mill or press. Denier is defined as grams of fiber per 9000 meters of fiber length. This is also referred to within the detailed description and the claims of the present disclosure as the "input fiber denier" or the "input fiber diameter" or the "fiber diameter." The diameter or denier of the fiber referred to within the detailed description and the claims is not with respect to the diameter of the fiber within synthetic organic fiber pellets after pressing/milling or within the fiber reinforced polypropylene composite resin after compounding. It is understood that during the fiber pelleting process and/or composite extrusion compounding process, the input fiber may undergo a change in denier or diameter due to shrinkage or expansion through the process. Denier may be related to fiber diameter for a given fiber type (fiber density).

The diameter of the synthetic organic fiber may be within the range having a lower limit of 5 μm and an upper limit of 100 μm. In a particular embodiment, the PET fibers have a diameter of from 25 to 40 μm (6 to 12 denier), or more particularly a diameter of from 25 to 30 μm (6 to 9 denier). In another embodiment, the input PET fiber may range from 5 to 15 denier. In another embodiment, the input PET fiber diameter ranges from 15 to 35 μm. In yet another embodiment, the PET fiber diameter is less than 15 microns. In another embodiment, the PET fiber denier is less than 5, or less than 4, or less than 3.2, or less than 2. In still yet another embodiment, the PET fiber denier is 3.1 (also referred to herein as low denier PET fiber). As the PET fiber denier or diameter decreases, generally increased loadings are needed in the PP/PET composite to maintain impact resistance constant.

The synthetic organic fiber may further contain additives commonly known in the art. For example, the organic fiber may include additives, such as dispersant, lubricant, flame-retardant, antioxidant, antistatic agent, light stabilizer, ultraviolet light absorber, carbon black, nucleating agent, plasticizer, and coloring agent such as dye or pigment.

The synthetic organic fiber used to make the compositions of the present disclosure is not limited by any particular fiber form. For example, the organic fiber may be in the form of continuous filament yarn, partially oriented yarn, or staple fiber. In another embodiment, the fiber may be a continuous multifilament fiber or a continuous monofilament fiber.

The synthetic organic fiber described above is fed in the form or pre-cut or chopped fiber along with a wax to a pelleting press or mill (hereinafter referred to as a pelleting press). A pre-step in the pelleting press process may be to mix the pre-cut synthetic organic fiber with a wax powder to insure a uniform, consistent distribution. For example, 12 mm high tenacity 6 denier per fiber PET fiber may be mixed with a polypropylene wax (e.g. Clariant, Licocene PP1502 fine grain). Prior to mixing, the organic fiber and the wax are weighed to obtain a formulation with specified amount of wax (2 to 20 wt %, or 5 to 15 wt %, or 8 to 12 wt % wax). In one advantageous form, 10 wt % wax powder is blended with the synthetic organic fiber.

In one form of mixing the pre-cut synthetic organic fibers and the wax powder, a plow mixer is used. In this type of mixer, there is a stationary cylindrical vessel with a rotating shaft mounted in the center. Plows are welded to the shaft to assist in the mixing. The pre-cut fibers and wax are loaded through the top inlet of the mixer. The shaft of the plow mixer rotates to mix the pre-cut fibers and wax powder. When working with pre-cut organic fiber, there needs to be adequate clearance between the plows and the vessel walls to insure adequate mixing and prevent the shaft of the mixer from locking up. In alternative forms, the pre-cut organic fibers and the wax may be mixed in a tumbler or in a ribbon type blender.

After the pre-mixing step, the fibers are coated with the wax. The wax generally has a low softening point (for example, a PP wax may have a softening point of 86° C.). During the pre-mixing step, the temperature may reach 90° C., and thus the wax should soften and adhere to the surface of the pre-cut synthetic organic fibers.

After the pre-mixing step of the process, the fiber-wax mixture is transferred to a volumetric or gravimetric feeder for dispensing the mixture at a controlled rate to the pelleting press. An exemplary gravimetric feeder is an Acrison BDF1.5. An advantageous setup of the feeder includes the use of an undersized feed auger in the feed tube to allow more clearance for the fibers. Other feeder types may also be used for the fibers.

Figure 2:
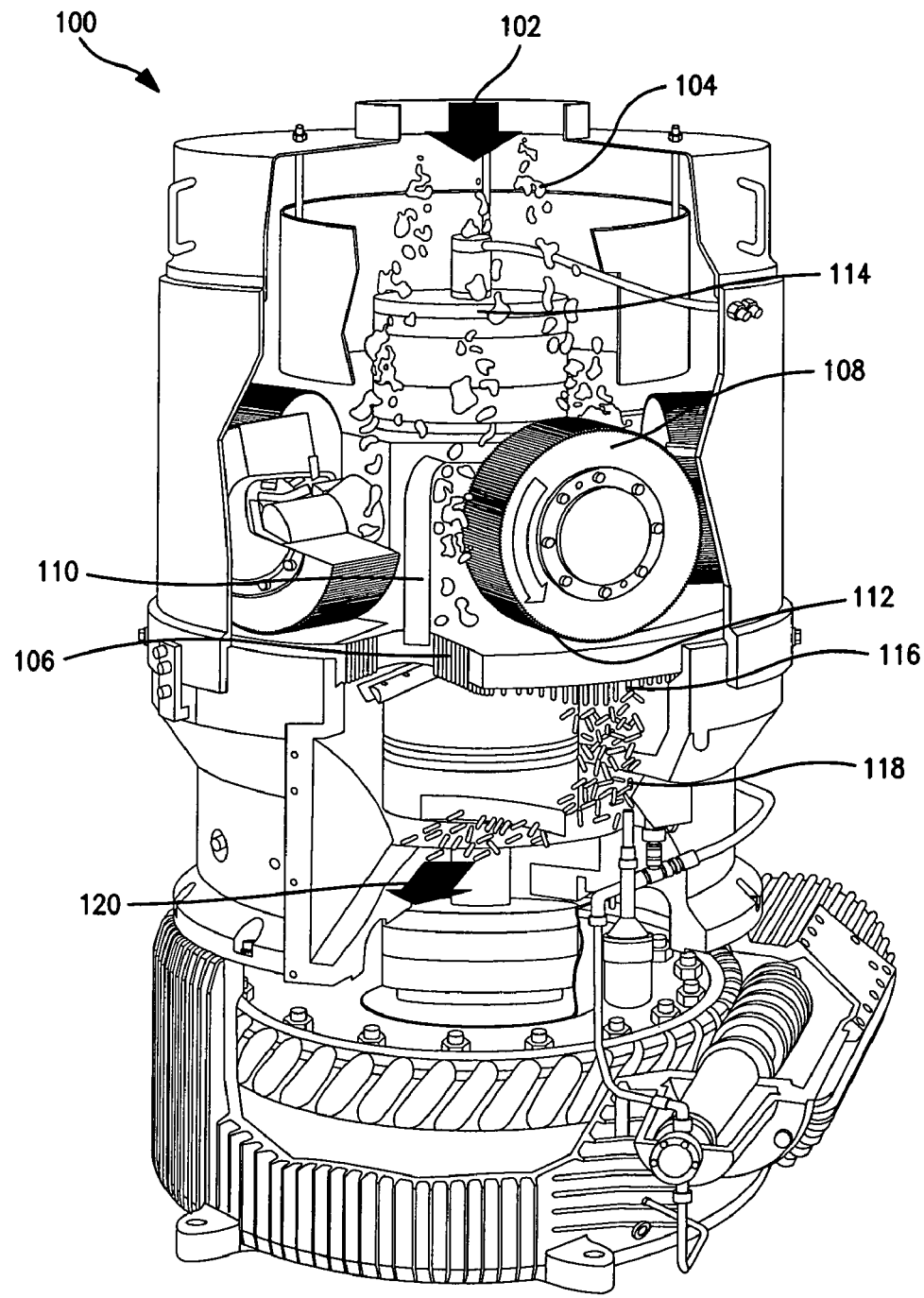
FIG. 2 depicts one form of the process for making synthetic organic fiber pellets using a pelleting mill or press.

The fiber-wax mixture is fed from the feeder directly to the top inlet of the pelleting press. A non-limiting exemplary pelleting press 100 is depicted in FIG. 2. Referring to FIG. 2, the synthetic organic fiber-wax mixture is fed at controlled ratio and rate to the product inlet opening 102 of the pelleting press 100. The synthetic organic fiber-wax mixture 104 then falls by gravity onto a strand die 106 positioned below pan grinder rollers 108 and a scraper 110. The pelleting process 100 may include one, or two, or three or four pan grinder rollers 108. In an advantageous form, the pelleting process includes two pan grinder rollers 108. The one or more pan grinder rollers 108 are located in close proximity to the inlet side of the strand die 106.

The scraper 110 helps direct the synthetic organic fiber-wax mixture 104 into the roller gap 112 between the pan grinder roller 108 and the die 106. The pan grinder rollers 108 are driven and the speed may be varied as well as the roller gap 112 and pressure using the hydraulic roller adjustment device 114. The strand die 106 includes a series of cylindrical shaped openings that are fixed in diameter and length. The pan grinder rollers 108 force the fiber-wax mixture 104 through the strand die 106. The synthetic organic fiber-wax mixture 104 is compacted by the pressing force exerted on the material in the roller gap 112 and then is forced through the die 106 to form continuous strands of a given diameter at the die exit. The diameter of the die hole openings may range from 2 to 12 mm, or 3 to 10 mm, or 3 to 8 mm, or 5 to 8 mm. In one form of the pelleting process 100, a die hole opening of 8 mm is advantageous. In another form of the pelleting process 100, a die hole opening of 5 mm is advantageous. The diameter of the die hole openings dictate the diameter of the pellet produced, and hence fiber pellets may range from 2 to 12 mm, or 3 to 10 mm, or 3 to 8 mm, or 5 to 8 mm in diameter. The compression ratio of the die 106 is the ratio of the die thickness (die hole length) to the diameter of the die hole opening and may range from 2:1 to 8:1, or 3:1 to 6:1. In one form of the pelleting process 100, die compression ratios of 2:1 and 4:1 are particularly advantageous with a 5 mm diameter die hole opening. In another form of the pelleting process 100, die compression ratios of 4:1 and 6:1 are particularly advantageous with a 8 mm diameter die hole opening.

Positioned just below and in close proximity to the bottom face (outlet side) of the strand die 106 is a rotary type cutting device 116 that includes rotating blades for cutting the continuous strands into fiber pellets 118. The pellet size may be controlled by the speed of the cutting device 116, and may range from ⅛ inch to 2 inches (3.2 mm to 50.8 mm) in length depending upon the output rate and the speed of the cutting device 116. The pelleting process 100 imparts mechanical energy to the fiber-wax mixture 104 and the fiber pellets 118, and therefore the temperature of the fiber may increase. This may be closely monitored to prevent any degradation of the synthetic organic fiber that may occur at elevated temperatures. The compression ratio may also have an effect on the temperature of the fiber with higher compression ratios generally leading to higher fiber temperatures.

The fiber pellets 118 are then conveyed to a pellet discharge 120 in the pelleting press 100 where the fiber pellets 118 may be collected for storage or conveyed continuously for further processing. Alternatively, the fiber pellets 118 from the pelleting press 100 may be discharged to a dryer/cooler (not shown). The dryer/cooler typically includes a moving, cooled belt in a cooled vessel to transport the fiber pellets 118 and allow adequate cooling of the fiber pellets 118 prior to collection for storage or further conveyance. The fiber pellet output rate of the pelleting press may range from 50 to 600 pounds per hour.

In another form of the pelleting process, the die is annular in shape and may rotate while one or more grinder rollers feeding the synthetic organic fiber-wax mixture are positioned on the inner portion of the annular die and may be stationary. AMANDUS KAHL GmbH & Co. KG is one designer and manufacturer of pelleting processes. California Pellet Mill is another designer and manufacturer of pelleting processes.

The wax is included in the synthetic organic fiber pellet to help bind the pre-cut fibers together during the pelleting process. The wax may be a synthetic wax, and/or a natural wax. Non-limiting exemplary synthetic waxes are chosen from polyolefin waxes (polyethylene, polypropylene, polybutene-1, copolymers thereof, and terpolymers thereof), polytetrafluoroethylene waxes, ethylene acrylic acid waxes, Fischer-Tropsch waxes and combinations thereof. Non-limiting exemplary natural waxes are chosen from paraffin waxes, Carnauba waxes, Montan waxes and combinations thereof. In addition, a combination of one or more synthetic waxes and one or more natural waxes may be included in the synthetic organic fiber pellet compositions disclosed herein.

The synthetic organic fiber pellet includes from 2 to 20 wt %, or 5 to 15 wt %, or 8 to 12 wt % wax. In one advantageous form, the synthetic organic fiber pellet includes 10 wt % wax.
Methods of Making Fiber Reinforced Polypropylene Composite Resin Pellets Using Synthetic Organic Fiber Pellets:

The synthetic organic fiber pellets described above are particularly useful in making fiber reinforced polypropylene composites. Polyester fiber, due to its low bulk density and the tendency to entangle, is difficult to consistently feed into polymer compounding equipment used for making fiber reinforced polypropylene composites. It has been discovered that the novel synthetic organic fiber pellets described above may be consistently fed into polymer compounding equipment used for making fiber reinforced polypropylene composites. The fiber reinforced polypropylene composites disclosed herein include a polypropylene based polymer, a synthetic organic fiber fed to the compounding equipment in fiber pellet form, and optional inorganic filler. The fiber reinforced polypropylene resin pellet compositions disclosed herein are not limited by any particular method for forming the compositions. One advantageous process for forming the compositions is by contacting polypropylene, synthetic organic fiber pellets (made by the pelleting press process), and optional inorganic filler in an extrusion compounding process. In one form, the extrusion compounding process may utilize a single screw compounding extruder and in another form, the extrusion compounding process may utilize a twin screw compounding extruder. In a particular aspect of these forms disclosed herein, the synthetic organic fiber pellets are fed into the extruder hopper or alternatively fed to the compounding extruder via a downstream feed port. The extrusion compounding process forms one or more strands of fiber reinforced polypropylene composites that are then cut through a pelletizing process into resin pellets of the desired length.

Figure 3:
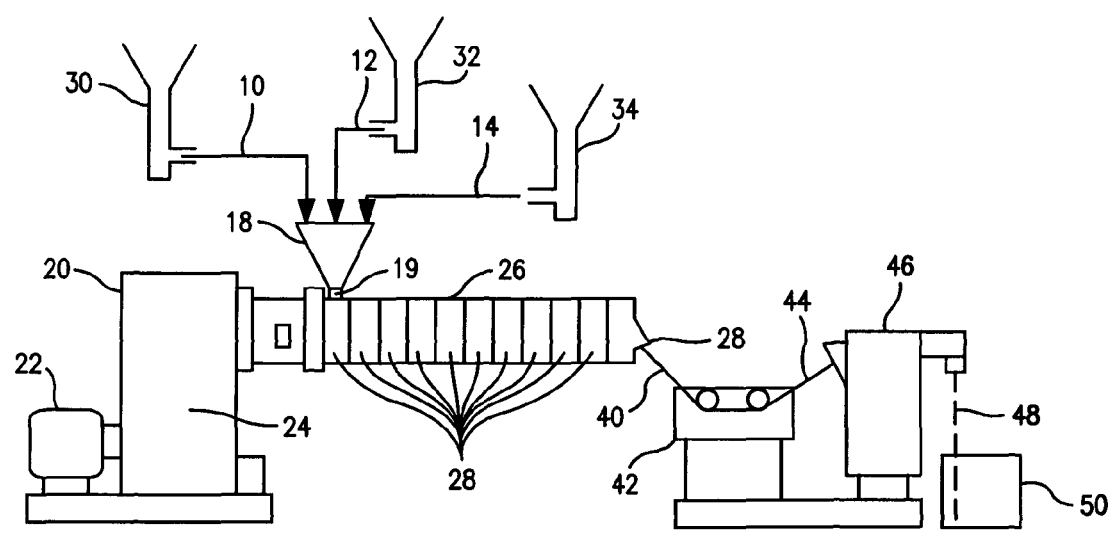
FIG. 3 depicts one form of the process for making fiber reinforced polypropylene composite resin pellets of the present disclosure using synthetic organic fiber pellets fed from a feeder into the hopper of a compounding extruder.

FIG. 3 depicts an exemplary schematic of one form of the process for making fiber reinforced polypropylene resin pellets of the present disclosure. Polypropylene based resin 10, inorganic filler 12, and synthetic organic fiber pellets 14 disclosed herein are fed into the extruder hopper 18 of a compounding extruder 20 (single or twin screw type). The extruder hopper 18 is positioned above the feed throat 19 of the compounding extruder 20. The extruder hopper 18 may alternatively be provided with an auger or agitator (not shown) for mixing the polypropylene based resin 10, the inorganic filler 12, and the fiber pellets 14 prior to entering the feed throat 19 of the compounding extruder 20. In an alternative embodiment, as depicted in FIG. 3, the inorganic filler 12 and/or fiber pellets 14 may be fed to the compounding extruder 20 at a downstream feed or injection port 27 in the compounding extruder barrel 26 positioned downstream of the extruder hopper 18 while the remaining components 10 are metered into the extruder hopper 18. It may be advantageous to feed the fiber pellets 14 at a downstream feed port 27 as compared to the extruder hopper 18 to avoid excessive thermal degradation, and shear induced degradation of the fiber through the compounding extruder. In an alternative embodiment, the inorganic filler 12, and/or the fiber pellets 14 may be fed to a combination of the extruder hopper 18 and one or more downstream feed ports 27. This may provide for the ability to feed higher loadings of inorganic filler 12, and/or the fiber pellets 14 into the compounding extruder 20.

Referring again to FIG. 3, the polypropylene based resin 10 is metered to the extruder hopper 18 via a feed system 30 for accurately controlling the feed rate. Similarly, the inorganic filler 12 is metered to the extruder hopper 18 via a feed system 32 for accurately controlling the feed rate. Similarly, the fiber pellets 14 are metered to the extruder hopper 18 via a feed system 34 for accurately controlling the feed rate. The feed systems 30, 32, 34 may be, but are not limited to, gravimetric feed systems or volumetric feed systems. Gravimetric feed systems are advantageous for accurately controlling the weight percentage of polypropylene based resin 10, inorganic filler 12 and fiber pellets 14 being fed to the extruder hopper 18.

With regard to downstream feeding of the inorganic filler and/or synthetic organic fiber pellets depicted in FIG. 4, one or more feed systems (not shown and to be discussed in detail below) are used for accurately controlling the feed rate of the inorganic filler 12 and/or fiber pellets 14 fed to the compounding extruder 20 at the downstream feed port 27. Again, the feed systems (not shown) may be, but are not limited to, gravimetric feed systems or volumetric feed systems.

Referring again to FIG. 3, the compounding extruder 20 includes a drive motor 22, a gear box 24, an extruder barrel 26 for holding one or two screws (not shown), and a strand die 28. The extruder barrel 26 is segmented into a number of heated temperature controlled zones 28. As depicted in FIG. 3, the extruder barrel 26 includes a total of ten temperature control zones 28. In one embodiment, the compounding extruder is a twin screw type. The two screws within the extruder barrel 26 of the compounding extruder 20 may be intermeshing or non-intermeshing, and may rotate in the same direction (co-rotating) or rotate in opposite directions (counter-rotating). From a processing perspective, the melt temperature should be maintained above the melting point of the polypropylene based resin 10, and below the melting temperature of the synthetic organic fiber pellet 14, such that the mechanical properties imparted by the fiber may be maintained when mixed into the polypropylene based resin 10. In one exemplary embodiment, the barrel temperature of the extruder zones do not exceed 154° C. when extruding PP homopolymer and PET fiber, which yields a melt temperature above the melting point of the PP homopolymer, but significantly below the melting point of the PET fiber. In another exemplary embodiment, the barrel temperatures of the extruder zones are set at 185° C. or lower, which also yields a melt temperature above the melting point of the PP homopolymer, but significantly below the melting point of the PET fiber. In another exemplary embodiment, the barrel temperatures of the extruder zones are set at 215° C. or lower.

Figure 5:
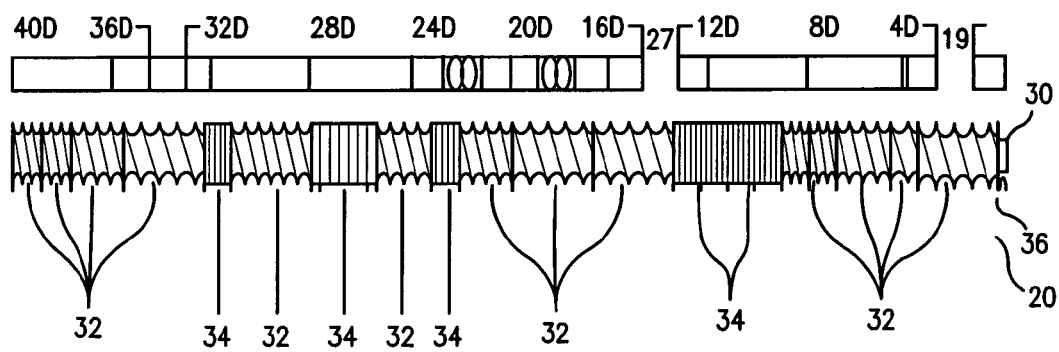
FIG. 5 depicts one form of a twin screw extruder screw configuration for making fiber reinforced polypropylene composites of the present disclosure.

An exemplary schematic of a twin screw type compounding extruder screw configuration for making fiber reinforced polypropylene resin pellets is depicted in FIG. 5. This particular screw design with numerous kneading elements may be needed when feeding continuous fiber from spools to both cut the fiber and disperse the fiber in the polypropylene melt. Such a design with numerous kneading elements may not be needed when feeding fiber pellets because the screw does not need to cut the organic fiber. The feed throat 19 allows for the introduction of polypropylene based resin, synthetic organic fiber pellets, and inorganic filler into a feed zone of the twin screw compounding extruder 20. The inorganic filler and/or fiber pellets may be optionally fed to the extruder 20 at the downstream feed port 27 of FIG. 5. The twin screws 30 of FIG. 5 include an arrangement of interconnected screw sections, including conveying elements 32 and kneading elements 34. The kneading elements 34 function to melt the polypropylene based resin, disperse the fiber of the fiber pellets within the melt, and mix the polypropylene based melt, fiber and inorganic filler to form a uniform blend. More particularly, the kneading elements function to disperse the fiber within the fiber pellets and inorganic filler within the PP based melt. A series of interconnected kneading elements 34 is also referred to as a kneading block. U.S. Pat. No. 4,824,256 to Haring, et al., herein incorporated by reference in its entirety, discloses co-rotating twin screw extruders with kneading elements. The first section of kneading elements 34 located downstream from the feed throat is also referred to as the melting zone of the twin screw compounding extruder 20. The conveying elements 32 function to convey the solid components, melt the polypropylene based resin, and convey the melt mixture of polypropylene based polymer, inorganic filler and fiber pellets downstream toward the strand die 28 (see FIG. 3) at a positive pressure.

The position of each of the screw sections as expressed in the number of diameters (D) from the start 36 of the extruder screws 30 is also depicted in FIG. 5. The extruder screws in FIG. 5 have a length to diameter ratio of 40/1, and at a position 32D from the start 36 of screws 30, there is positioned a kneading element 34. The particular arrangement of kneading and conveying sections is not limited to that as depicted in FIG. 5, however one or more kneading blocks consisting of an arrangement of interconnected kneading elements 34 may be positioned in the twin screws 30 at a point downstream of where fiber pellets and inorganic filler are introduced to the extruder barrel. The twin screws 30 may be of equal screw length or unequal screw length. Other types of mixing sections may also be included in the twin screws 30, including, but not limited to, Maddock mixers, and pin mixers.

Figure 6:
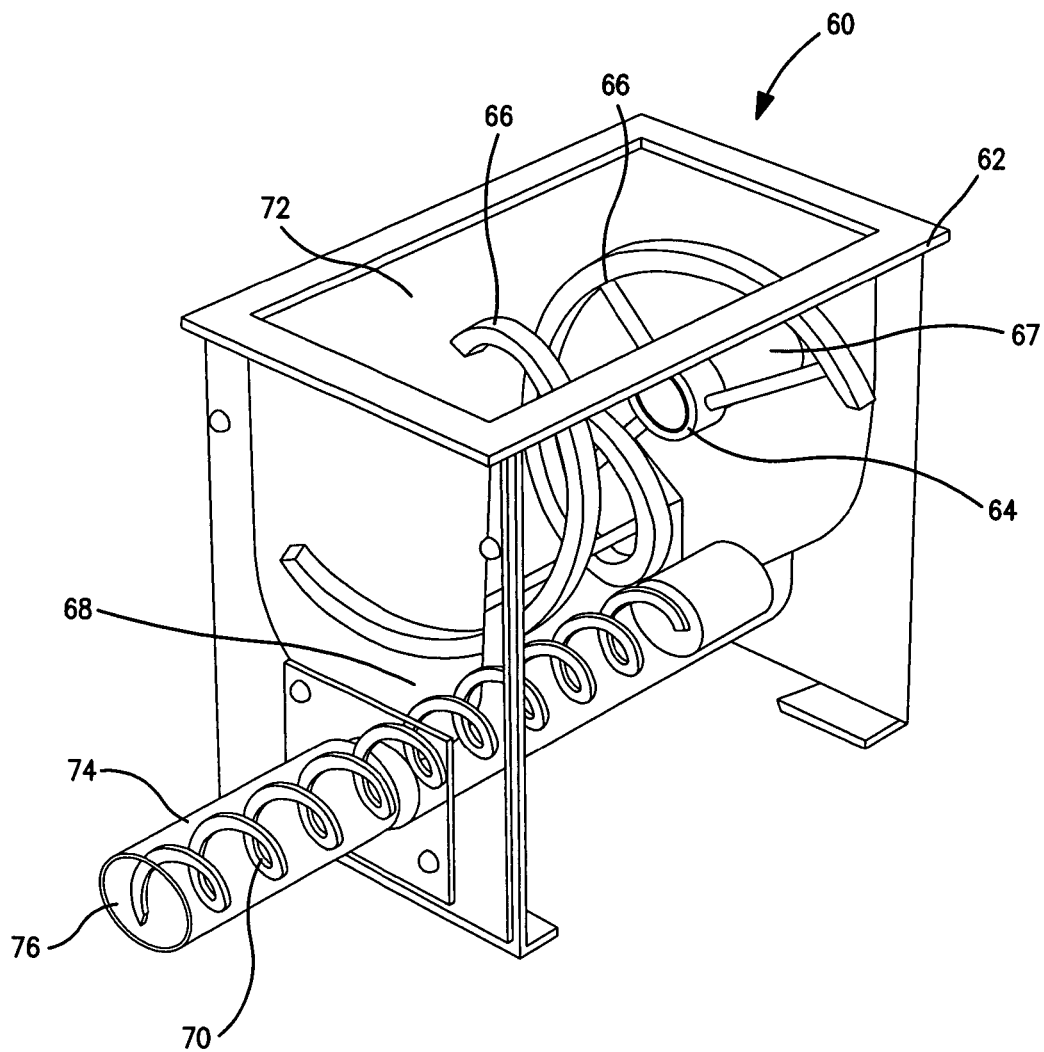
FIG. 6 depicts one exemplary form of a feeder for feeding the synthetic organic fiber pellets of the present disclosure that includes a conditioning agitator and a metering auger.

FIG. 6 is an exemplary schematic of a feeder 60 that may be used to meter the synthetic organic fiber pellets to the compounding extruder (not shown) at either the extruder hopper or a downstream feed port in the extrusion compounder. Referring to FIG. 6, the fiber pellets (not shown) are placed in a feeder hopper 62. Within the feed hopper 62 is a single conditioning auger/agitator 64, which includes a spiral shaped auger or mixer blade 66 radiating from the center shaft 67 of the auger/agitator 64. The single conditioning auger/agitator 64 prevents the fiber pellets from bridging in the throat 68 leading to the spiral type metering auger 70. As shown in FIG. 6, the spiral metering auger 70 does not have a center shaft to allow the fiber pellets from the conditioning auger/agitator 64 to fill the void space between the spirals for ease of conveying by the metering auger 70. Both the conditioning auger/agitator 64 and the metering auger 70 are driven by independent motors and controllers.

The feed rate of the fiber pellets is determined by the efficiency of filling the metering auger 70 with fiber and the speed in rpms of the metering auger 70. The channels between the spirals of the auger 70 are more effectively filled when the conditioning auger/agitator 64 is used. More particularly, the conditioning auger/agitator 64 may prevent bridging of the fiber pellets (not shown) in the throat 68 leading to the auger 70. The metering auger 70 is again housed in a cylindrical housing 74 of larger inside diameter than the outside diameter of the auger 70. The length of the cylindrical housing 74 and the metering auger 70 are not particularly limited, and may be as short as necessary while still maintaining fiber pellet feed rate consistency and accuracy. Fiber pellets are gravity fed into the metering auger 70 at the throat 68 of the feeder hopper 62 and is conveyed out of the auger at the exit end 76 of the cylindrical housing 74. The feeder 60 may operate in a gravimetric loss in weight type mode or a volumetric type mode, although the gravimetric mode is advantageous for improved feed rate accuracy. The auger type fiber pellet feeder system depicted in FIG. 6 may be varied within deviating from the scope of the disclosure herein. For example, the number and type of mixing blades used on the conditioning auger/agitator may take on many different forms (paddles, spirals, etc.) and configurations. The number of conditioning augers/agitators in the feeder hopper may be one, or two, or three, or more. In addition, the number of metering augers 70 may be two as opposed to one. Alternatively, the number of metering augers 70 may be three or more. In addition, the one or more metering augers 70 may have a center shaft and variations on the design of the spirals for metering the pre-cut fiber. A metering auger 70 with a shaft may be less efficient in metering rate, but this may be compensated for by a larger metering auger diameter and number of metering augers. The size of the auger type fiber feeder system will depend on the desired feed rate of the fiber pellets. Fiber pellet feed rates using the feeder 60 may be controlled from less than 1 kilogram per hour to up to 500 kilograms per hour depending upon the size of the compounding extruder and the fiber loading desired in the fiber reinforced polypropylene compositions. Generally, the size of the feeder hopper 62, the one or more conditioning augers/agitators 64 and the one or more metering augers 70 are increased as the desired fiber pellet output rate is increased.

Referring once again to FIG. 3, the uniformly mixed PET fiber reinforced polypropylene composite melt comprising polypropylene based polymer 10, inorganic filler 12, and synthetic organic fiber 14 is metered by the extruder screws to a strand die 28 for forming one or more continuous strands 40 of fiber reinforced polypropylene composite melt. The one or more continuous strands 40 are then passed into water bath 42 for cooling them below the melting point of the fiber reinforced polypropylene composite melt to form a solid fiber reinforced polypropylene composite strands 44. The water bath 42 is typically cooled and controlled to a constant temperature much below the melting point of the polypropylene based polymer. The solid fiber reinforced polypropylene composite strands 44 are then passed into a pelletizer or pelletizing unit 46 to cut them into fiber reinforced polypropylene composite resin 48 into fiber reinforced polypropylene based resin pellets. Non-limiting exemplary pelletizers include underwater type pelletizers and strand type pelletizers. In one advantageous process form, a strand pelletizer is used to cut the fiber reinforced polypropylene composite into longer resin pellets than may be formed with an underwater type pelletizer. Generally, the number of cutting blades and the speed of the cutting blades in the pelletizer 46 may be used to control the resulting resin pellet length produced. The fiber reinforced polypropylene composite resin pellets 48 may then be accumulated in boxes 50, barrels, or alternatively conveyed to silos for storage.

Figure 4:
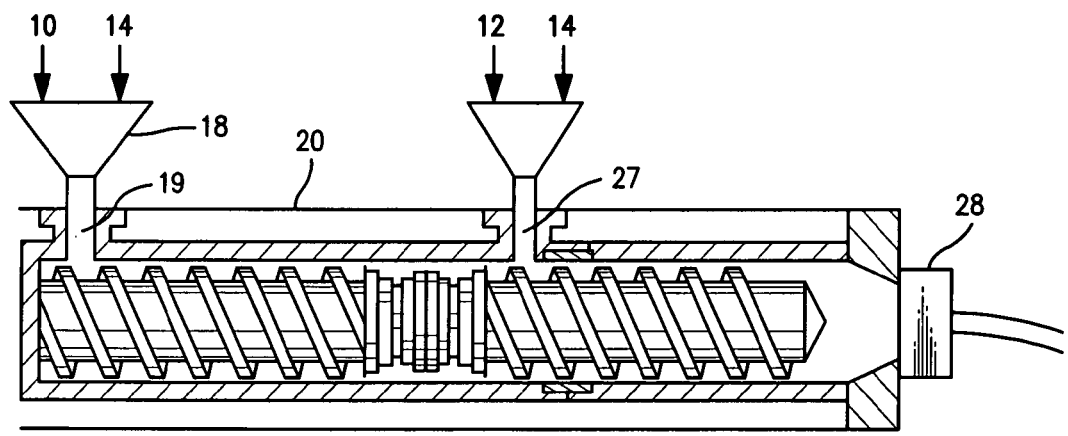
FIG. 4 depicts another form of the process for making fiber reinforced polypropylene composite resin pellets of the present disclosure using synthetic organic fiber pellets fed from a feeder into a downstream feed port of a compounding extruder.

The fiber reinforced polypropylene composites disclosed herein may be formed into resin pellets using the extrusion compounding and pelletizing processes exemplified in FIGS. 3, 4 and 5. The composite resin pellets produced in the pelletizer 46 of FIG. 3 may have a length of from 1.0 mm to 25.4 mm. Pellet length is measured using a ruler or other linear measuring device. The lower limit of the resin pellet length may be 1.0 mm, or 2.0 mm, or 3.2 mm, or 4.8 mm, or 6.4 mm, or 8.0 mm, or 9.5 mm. The upper limit of the resin pellet length may be 8.0 mm, or 9.5 mm, or 11.1 mm or 12.7 mm, or 13.9 mm, or 15.0 mm, or 17.0 mm, or 19.1 mm, or 21.0 mm, or 23.0 mm, or 25.4 mm. In one particular embodiment, fiber reinforced polypropylene resin pellets may have a pellet length from 3.2 to 12.7 mm, or 6.4 to 9.5 mm. In another particular embodiment, fiber reinforced polypropylene resin pellets may have a pellet length from 3.2 to 12.7 mm, or 3.2 to 19.1 mm, or 3.2 to 9.5 mm, or 6.4 to 9.5 mm, or 9.5 to 19.1 mm or 9.5 to 12.7 mm. The optimum resin pellet length range for impact resistance may depend on such exemplary factors as organic fiber type, input organic fiber diameter, organic fiber loading level, input organic fiber length within the fiber reinforced polypropylene melt, method of feeding the organic fiber into the extrusion compounding process (as a chopped or staple fiber, as continuous strands being unwound from spools or as fiber pellets as disclosed herein). In particular, the method of feeding the PET fiber into the extrusion compounding process as a chopped/staple fiber or as continuous strands being unwound from spools, or as fiber pellets as disclosed herein may impact the resultant impact resistance of articles molded from the resin pellets.

Articles of the present disclosure may be alternatively made by directly forming the polypropylene resin and additives needed to form fiber-reinforced polypropylene composition into an article or part via a combined in-line compounding and molding process. This is referred to as an in-line compounding and molding process and consists of the coupling of a compounding process and a molding process. Using in-line compounding and molding, materials comprising reinforced polypropylene compositions may be compounded and molded all in one step. The polymer, fiber pellets and talc filler may be introduced into an extruder attached directly to an injection or compression molder. Instead of creating pellets of compounded material in a separate compounding process, which are later molded, the molten compound is conveyed directly to the mold from the compounding process. In one exemplary embodiment of the in-line compounding and molding process, between the compounding process and the molding process may be a melt reservoir for holding surge melt from the continuous compounding process before it enters into the discontinuous molding process. In another exemplary embodiment of the in-line compounding and molding process, between the compounding process and the molding process is a flow channel without a melt reservoir that leads to two or more molding units. Further details of the method of making fiber reinforced polypropylene articles using the in-line compounding and molding process, and the benefits provided thereto are included in U.S. patent application Ser. No. 11/435,578, herein incorporated by reference in its entirety.

Fiber Reinforced Polypropylene Compositions:

The fiber reinforced polypropylene composite resin pellets of the present disclosure simultaneously have desirable stiffness, as measured by having a flexural modulus of at least 300,000 psi (2.07 GPa), and toughness, as measured by exhibiting ductility during instrumented impact testing. In addition, fiber reinforced polypropylene composite resin pellets of the present disclosure with particular pellet lengths may yield articles with drop dart impact resistance values exceeding 5.0, or 6.0, or 7.0, or 8.0, or 9.0, or 10.0, or 11.0, or 12.0, or 13.0 newton meter. In a particular embodiment, the fiber reinforced polypropylene composite resin pellets after molding may yield an article having a flexural modulus of at least 300,000 psi (2.07 GPa), or at least 350,000 psi (2.41

GPa), or at least 370,000 psi (2.55 GPa), or at least 390,000 psi (2.69 GPa), or at least 400,000 psi (2.76 GPa), or at least 450,000 psi (3.10 GPa). Still more particularly, the fiber reinforced polypropylene composite resin pellets after molding may yield an article have a flexural modulus of at least 600,000 psi (4.14 GPa), or at least 800,000 psi (5.52 GPa). It is also believed that having a weak interface between the polypropylene matrix and the synthetic organic fiber contributes to fiber pullout; and, therefore, may enhance toughness. Thus, there is no need to add modified polypropylenes to enhance bonding between the fiber and the polypropylene matrix, although the use of modified polypropylene may be advantageous to enhance the bonding between a filler, such as talc or wollastonite, and the matrix polymer. In addition, in one embodiment, there is no need to add lubricant to weaken the interface between the polypropylene and the organic fiber to further enhance fiber pullout. Some embodiments also display no splintering during instrumented dart impact testing, which yield a further advantage of not subjecting a person in close proximity to the impact to potentially harmful splintered fragments. This characteristic is advantageous in automotive applications.

Compositions of the present disclosure generally include at least 25 wt %, based on the total weight of the composition, of polypropylene based polymer as the matrix resin. In a particular embodiment, the polypropylene is present in an amount of at least 30 wt %, or at least 35 wt %, or at least 40 wt %, or at least 45 wt %, or at least 50 wt %, or in an amount within the range having a lower limit of 30 wt %, or 35 wt %, or 40 wt %, or 45 wt %, or 50 wt %, and an upper limit of 60 wt %, or 75 wt %, or 80 wt %, or 90 wt % based on the total weight of the composition. In another embodiment, the polypropylene is present in an amount of at least 25 wt %.

The polypropylene based resin used as the matrix resin is not particularly restricted and is generally selected from propylene homopolymers, propylene-ethylene random copolymers, propylene-butene-1 random copolymers, propylene-hexene-1 random copolymers, propylene-octene-1-random copolymers, other propylene-α-olefin random copolymers, propylene block copolymers, propylene impact copolymers, ethylene-propylene-butene-1 terpolymers and combinations thereof. In a particular embodiment, the polypropylene is a propylene homopolymer. In another particular embodiment, the polypropylene is a propylene impact copolymer comprising from 78 to 95 wt % homopolypropylene and from 5 to 22 wt % ethylene-propylene rubber, based on the total weight of the impact copolymer. In a particular aspect of this embodiment, the propylene impact copolymer comprises from 90 to 95 wt % homopolypropylene and from 5 to 10 wt % ethylene-propylene rubber, based on the total weight of the impact copolymer.

The polypropylene base resin of the matrix resin may have a melt flow rate of from 20 to 1500 g/10 min. In a particular embodiment, the melt flow rate of the polypropylene matrix resin is greater 100 g/10 min, and still more particularly greater than or equal to 400 g/10 min. In yet another embodiment, the melt flow rate of the polypropylene matrix resin is less than or equal to 2000 g/10 min. The higher melt flow rate permits for improvements in processability, throughput rates, and higher loading levels of organic fiber and inorganic filler without negatively impacting flexural modulus and impact resistance.

In a particular embodiment, the matrix polypropylene may contain less than 0.1 wt % of a modifier, based on the total weight of the polypropylene. Typical modifiers include, for example, unsaturated carboxylic acids, such as acrylic acid, methacrylic acid, maleic acid, itaconic acid, fumaric acid or esters thereof, maleic anhydride, itaconic anhydride, and derivates thereof. In another particular embodiment, the matrix polypropylene does not contain a modifier. In still yet another particular embodiment, the polypropylene based polymer further includes from 0.1 wt % to less than 10 wt % of a polypropylene based polymer modified with a grafting agent. The grafting agent includes, but is not limited to, acrylic acid, methacrylic acid, maleic acid, itaconic acid, fumaric acid or esters thereof, maleic anhydride, itaconic anhydride, and combinations thereof.

The polypropylene may further contain additives commonly known in the art, such as dispersant, lubricant, flame-retardant, antioxidant, antistatic agent, light stabilizer, ultraviolet light absorber, carbon black, nucleating agent, plasticizer, and coloring agent such as dye or pigment. The amount of additive, if present, in the polypropylene matrix is generally from 0.5 wt % or 2.5 wt % to 7.5 wt % or 10 wt %, based on the total weight of the matrix. Diffusion of additive(s) during processing may cause a portion of the additive(s) to be present in the fiber.

The polypropylene matrix resin of the present disclosure is not limited by any particular polymerization method for producing the matrix polypropylene, and the polymerization processes described herein are not limited by any particular type of reaction vessel. For example, the matrix polypropylene can be produced using any of the well known processes of solution polymerization, slurry polymerization, bulk polymerization, gas phase polymerization, supercritical polymerization and combinations thereof. Furthermore, the disclosure is not limited to any particular catalyst for making the polypropylene, and may, for example, include Ziegler-Natta or metallocene catalysts.

The fiber reinforced polypropylene composite resin pellets disclosed herein generally include at least 5 wt %, based on the total weight of the composition, of the synthetic organic polymer-based fiber. In a particular embodiment, the fiber is present in an amount of at least 5 wt %, or at least 7.5 wt %, or at least 10 wt %, or at least 15 wt %, or at least 20 wt %, or in an amount within the range having a lower limit of 5 wt %, 7.5 wt %, 10 wt %, or 15 wt %, or wt %, or 25 wt %, and an upper limit of 25 wt %, or 30 wt %, or 40 wt %, or 50 wt %, or 55 wt %, or 60 wt %, or 70 wt %, based on the total weight of the composition. In another embodiment, the synthetic organic fiber is present in an amount of at least 10 wt % and up to 40 wt %. In yet another embodiment, synthetic organic fiber is present in an amount of at least 20 wt % and up to 40 wt %. In order to improve the impact resistance, synthetic organic fibers are also referred to as reinforcing fibers and are incorporated into the polypropylene based polymer matrix via fiber pellets during the extrusion compounding process.

As described above for synthetic organic fiber pellets, the synthetic organic polymer used as the fiber in the fiber reinforced polypropylene composites is not particularly restricted and is generally selected from the group consisting of polyalkylene terephthalates, polyalkylene naphthalates, polyamides, polyolefins, polyacrylonitrile, and combinations thereof. In a particular embodiment, the fiber comprises a polymer selected from the group consisting of polyethylene terephthalate (PET), polybutylene terephthalate, polyamide and acrylic. In another embodiment, PET fiber is advantageous in yielding PET fiber reinforced polypropylene resin pellets with drop dart impact resistance values of at least 5.0 newton meter and exhibiting no splintering upon drop dart impact testing over a range of pellet lengths of 3.2 to 25.4 mm. In another particular embodiment, PET fiber is advantageous in yielding PET fiber reinforced polypropylene resin pellets with drop dart impact resistance values of at least 5.3 newton meter over a range of pellet lengths ranging from 3.2 to 12.7 mm.

In another embodiment of the fiber reinforced polypropylene resin pellets disclosed herein, the fiber reinforced polypropylene compositions further include from 0.01 to 0.2 wt %, or more particularly from 0.05 to 0.1 wt % lubricant, based on the total weight of the composition. Suitable lubricants include, but are not limited to, silicon oil, silicon gum, fatty amide, paraffin oil, paraffin wax, ester oil, and combinations thereof. Lubricant incorporation may assist with the pull-out of organic fiber from the polypropylene based matrix polymer to further improve impact resistance.

In another exemplary embodiment of the present disclosure, the fiber reinforced polypropylene resin pellets may be made cloth-like in terms of appearance, feel, or a combination thereof. Cloth-like appearance or look is defined as having a uniform short fiber type of surface appearance. Cloth-like feel is defined as having a textured surface or fabric type feel. The incorporation of the colorant fiber into the fiber reinforced polypropylene composition results in a cloth-like appearance. When the fiber reinforced polypropylene composition is processed through a mold with a textured surface, a cloth-like feel is also imparted to the surface of the resulting molded part.

Cloth-like fiber reinforced polypropylene resin pellets of the present disclosure generally include from 0.1 to 2.5 wt %, based on the total weight of the composition, of a colorant fiber. Still more advantageously, the colorant fiber is present from 0.5 to 1.5 wt %, based on the total weight of the composition. Even still more advantageously, the colorant fiber is present at less than 1.0 wt %, based on the total weight of the composition.

The colorant fiber type is not particularly restricted and is generally selected from the group consisting of cellulosic fiber, acrylic fiber, polyamide type fiber or polyester type fiber. Polyester type fibers include, but are not limited to, polyethylene terephlalate, polybutylene terephalate, and polyethylene naphthalate. Polyamide type fibers include, but are not limited to, nylon 6, nylon 6,6, nylon 4,6 and nylon 6,12. In a particular embodiment, the colorant fiber is cellulosic fiber, also commonly referred to as rayon. In another particular embodiment, the colorant fiber is a nylon type fiber.

The colorant fiber used to make the fiber reinforced polypropylene resin pellets disclosed herein is not limited by any particular fiber form prior to being chopped for incorporation into the fiber reinforced polypropylene composition. For example, the colorant fiber may be in the form of continuous filament yarn, partially oriented yarn, or staple fiber. In another embodiment, the colorant fiber may be a continuous multifilament fiber or a continuous monofilament fiber. In yet another form, the colorant fiber may be formed into a colorant fiber pellet using the pelleting press process disclosed herein. In this form, colorant fiber pellets are fed to the extrusion compounding process to make the fiber reinforced polypropylene composites disclosed herein. This allows for improved consistency and accuracy in feeding the colorant fiber to the compounding process and hence improved dispersion of the colorant fiber throughout the fiber reinforced polypropylene composites after molding.

The length and diameter of the colorant fiber may be varied to alter the cloth-like appearance in the molded article. The length and diameter of the colorant fiber of the present disclosure is not particularly restricted. In a particular embodiment, the input colorant fibers to the compounding process have a length of less than 6.4 mm, or advantageously a length of between 0.8 to 3.2 mm. In another particular embodiment, the diameter of the input colorant fibers to the pelleting press to make colorant fiber pellets or the compounding process when feeding colorant fiber directly to the compounding process is within the range having a lower limit of 10 μm and an upper limit of 100 μm.

The colorant fiber is colored with a coloring agent, which comprises either inorganic pigments, organic dyes or a combination thereof. U.S. Pat. Nos. 5,894,048; 4,894,264; 4,536,184; 5,683,805; 5,328,743; and 4,681,803 disclose the use of coloring agents, the disclosures of which are incorporated herein by reference in their entirety. Exemplary pigments and dyes incorporated into the colorant fiber include, but are not limited to, phthalocyanine, azo, condensed azo, azo lake, anthraquinone, perylene/perinone, indigo/thioindigo, isoindolinone, azomethineazo, dioxazine, quinacridone, aniline black, triphenylmethane, carbon black, titanium oxide, iron oxide, iron hydroxide, chrome oxide, spinel-form calcination type, chromic acid, talc, chrome vermilion, iron blue, aluminum powder and bronze powder pigments. These pigments may be provided in any form or may be subjected in advance to various dispersion treatments in a manner known per se in the art. Depending on the material to be colored, the coloring agent can be added with one or more of various additives such as organic solvents, resins, flame retardants, antioxidants, ultraviolet absorbers, plasticizers and surfactants.

The base fiber reinforced polypropylene base composite material that the colorant fiber is incorporated into may also be colored using the inorganic pigments, organic dyes or combinations thereof. Exemplary pigments and dyes for the base fiber reinforced polypropylene composite material may be of the same types as indicated in the preceding paragraph for the colorant fiber. Typically the base fiber reinforced polypropylene composite material is made of a different color or a different shade of color than the colorant fiber, such as to create a cloth-like appearance upon uniformly dispersing the short colorant fibers in the colored base fiber reinforced polypropylene composite material. In one particular exemplary embodiment, the base fiber reinforced polypropylene composite material is light grey in color and the colorant fiber is dark grey or blue in color to create a cloth-like look from the addition of the short colorant fiber uniformly dispersed through the base fiber reinforced polypropylene composite material.

The colorant fiber may be incorporated into the fiber reinforced polypropylene composite either in the form of colorant fiber pellets using the pelleting press process disclosed herein, or in the form of chopped fiber fed directly into the base fiber reinforced polypropylene composite material via the twin screw or single screw extrusion compounding process, or in the form of a masterbatch resin to the twin screw or single screw extrusion compounding process. Colorant fiber pellets are particularly advantageous in facilitating the dispersion of the colorant fiber within the fiber reinforced polypropylene composite base material. When the colorant fiber is incorporated as part of a masterbatch resins, exemplary carrier resins include, but are not limited to, polypropylene homopolymer, ethylene-propylene copolymer, ethylene-propylene-butene-1 terpolymer, propylene-butene-1 copolymer, low density polyethylene, high density polyethylene, and linear low density polyethylene. In one exemplary embodiment, the colorant fiber is incorporated into the carrier resin at less than 25 wt %. The colorant fiber masterbatch is then incorporated into the fiber reinforced polypropylene composite base material at a loading of from 1 wt % to 10 wt %, or from 2 to 6 wt %. In a particularly advantageous embodiment, the colorant fiber masterbatch is added at 4 wt % based on the total weight of the composition. In another exemplary embodiment, a masterbatch of either black rayon or black nylon type fibers in linear low density polyethylene carrier resin is incorporated at a loading of 4 wt % in the fiber reinforced polypropylene composite base material.

The colorant fiber or colorant fiber masterbatch may be fed to the twin screw or single screw extrusion compounding process with a gravimetric feeder at either the feed hopper or at a downstream feed port in the barrel of the twin screw or single screw extruder. Kneading and mixing elements are incorporated into the twin screw or single screw extruder screw design downstream of the colorant fiber or colorant fiber masterbatch injection point, such as to uniformly disperse the colorant fiber within the cloth-like fiber reinforced polypropylene composite material.

Compositions of the present disclosure optionally include inorganic filler in an amount of at least 1 wt %, or at least 5 wt %, or at least 10 wt %, or in an amount within the range having a lower limit of 0 wt %, or 1 wt %, or 5 wt %, or 10 wt %, or 15 wt %, and an upper limit of 25 wt %, or 30 wt %, or 35 wt %, or 40 wt %, or 50 wt %, or 60 wt %, based on the total weight of the composition. In yet another embodiment, the inorganic filler may be included in the polypropylene fiber composite in the range of from 10 wt % to 60 wt %. In a particular embodiment, the inorganic filler is selected from the group consisting of talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof. The talc may have a size of from 1 to 100 microns. In one particular embodiment, at a high talc loading of up to 60 wt %, the polypropylene fiber composite exhibited a flexural modulus of at least 750,000 psi and no splintering during instrumented impact testing (15 mph, −29° C., 25 lbs). In another particular embodiment, at a low talc loading of as low as 10 wt %, the polypropylene fiber composite exhibited a flexural modulus of at least 325,000 psi and no splintering during instrumented impact testing (15 mph, −29° C., 25 lbs). In addition, wollastonite loadings of from 10 wt % to 60 wt % in the polypropylene fiber composite yielded an outstanding combination of impact resistance and stiffness.

In another particular embodiment, fiber reinforced polypropylene composite resin pellets including a polypropylene based resin with a melt flow rate of 80 to 1500, 5 to 15 wt % of polyester fiber, and 50 to 60 wt % of inorganic filler displayed a flexural modulus of 850,000 to 1,200,000 psi and did not shatter during instrumented impact testing at −29 degrees centigrade, tested at 25 pounds and 15 miles per hour. The inorganic filler includes, but is not limited to, talc and wollastonite. This combination of stiffness and toughness is difficult to achieve in a polymeric based material. In addition, the fiber reinforced polypropylene composition has a heat distortion temperature at 66 psi of 140 degrees centigrade, and a flow and cross flow coefficient of linear thermal expansion of $2.2 \times 10^{-5}$ and $3.3 \times 10^{-5}$ per degree centigrade respectively. In comparison, rubber toughened polypropylene has a heat distortion temperature of 94.6 degrees centigrade, and a flow and cross flow thermal expansion coefficient of $10 \times 10^{-5}$ and $18.6 \times 10^{-5}$ per degree centigrade respectively.

Applications of Fiber Reinforced Polypropylene Composites:

The fiber reinforced polypropylene composite resin pellets disclosed herein are advantageously molded into articles. Articles made from the fiber-reinforced polypropylene composite resin pellets described herein include, but are not limited to, automotive parts, household appliances, and boat hulls. Automotive parts include both interior and exterior automobile parts. Cloth-like fiber reinforced polypropylene articles are particularly suitable for interior automotive parts because of the unique combination of toughness, stiffness and aesthetics. More particularly, the non-splintering nature of the failure mode during instrumented impact testing, and the cloth-like look make the cloth-like fiber reinforced polypropylene composites disclosed herein are suited for interior automotive parts, and for interior trim cover panels. Exemplary, but not limiting, interior trim cover panels include steering wheel covers, head liner panels, dashboard panels, interior door trim panels, pillar trim cover panels, and under-dashboard panels. Pillar trim cover panels include a front pillar trim cover panel, a center pillar trim cover panel, and a quarter pillar trim cover panel. Other interior automotive parts include package trays, and seat backs. Articles made from the polypropylene compositions described herein are also suitable for exterior automotive parts, including, but not limited to, bumpers, front end modules, aesthetic trim parts, body panels, under body parts, under hood parts, door cores, and other structural parts of the automobile.

Articles molded from the fiber reinforced polypropylene composite resin pellets disclosed herein provide one or more of the following non-limiting exemplary advantages: an advantageous combination of toughness, stiffness, and aesthetics, improved instrumented impact resistance, improved flexural modulus, improved splinter or shatter resistance during instrumented impact testing, fiber pull out during instrumented impact testing without the need for lubricant additives, ductile (non-splintering) failure mode during instrumented impact testing as opposed to brittle (splintering), a higher heat distortion temperature compared to rubber modified polypropylene, improved part surface appearance from lower inorganic filler loadings, lower part density from lower inorganic filler loadings, a lower flow and cross flow coefficient of linear thermal expansion compared to rubber modified polypropylene, the ability to accurately feed organic reinforcing fiber in a pellet form into a compounding extruder, reduced production costs and reduced raw material costs, improved part surface appearance, the ability to produce polypropylene fiber composites exhibiting a cloth-like look and/or feel, uniform dispersion of the organic reinforcing fiber and colorant fiber in the composite pellets, improved drop dart impact resistance through tight control of fiber reinforced polypropylene resin pellet length, and retention of impact resistance, ductile failure mode and stiffness after the incorporation of colorant with colorant fiber.

The following examples illustrate the present disclosure and the advantages thereto without limiting the scope thereof.

Test Methods

Fiber reinforced polypropylene compositions described herein were injection molded at 2300 psi pressure, 401° C. at all heating zones as well as the nozzle, with a mold temperature of 60° C.

Flexural modulus data was generated for injected molded samples produced from the fiber reinforced polypropylene compositions described herein using the ISO 178 standard procedure.

Instrumented impact test data was generated for injected mold samples produced from the fiber reinforced polypropylene compositions described herein using ASTM D3763. Ductility during instrumented impact testing (test conditions of 15 mph, −29° C., 25 lbs) is defined as no splintering of the sample.

Drop dart impact test data was generated for injected mold samples produced from the PET fiber reinforced polypropylene resin pellets described herein using ASTM test method D3763 and reported in drop dart impact energy values of newton meter.

Impact resistance as described herein is measured by the total energy in newton meter to shatter an article molded from the fiber reinforced polypropylene resin pellets. Drop dart impact resistance measured via ASTM test method D3763 and was used to establish the relationship between pellet length and impact resistance for both chopped PET fiber and continuous PET fiber feeds. The higher the total energy required to shatter the article, the greater the impact resistance.

EXAMPLES

PP3505G is a propylene homopolymer commercially available from ExxonMobil Chemical Company of Baytown, Tex. The MFR (2.16 kg, 230° C.) of PP3505G was measured according to ASTM D1238 to be 400 g/10 min.

PP7805 is an 80 MFR propylene impact copolymer commercially available from ExxonMobil Chemical Company of Baytown, Tex.

PP8114 is a 22 MFR propylene impact copolymer containing ethylene-propylene rubber and a plastomer, and is commercially available from ExxonMobil Chemical Company of Baytown, Tex.

PP8224 is a 25 MFR propylene impact copolymer containing ethylene-propylene rubber and a plastomer, and is commercially available from ExxonMobil Chemical Company of Baytown, Tex.

PO1020 is 430 MFR maleic anhydride functionalized polypropylene homopolymer containing 0.5-1.0 weight percent maleic anhydride.

PP7905E1 is 85 MFR impact copolymer commercially available from ExxonMobil Chemical Company of Baytown, Tex.

Cimpact CB7 is a surface modified talc, V3837 is a high aspect ratio talc, and Jetfine 700° C. is a high surface area talc, all available from Luzenac America Inc. of Englewood, Colo.

HTP1c is a 1.5 um particle size non-surface modified talc with an aspect ratio of between 2 to 3:1 available from Imi Fabi.

Illustrative Example 1

½ inch long pre-cut PET fibers of 6 denier diameter and 6 gram/denier tenacity from Minifibers Inc. were converted into pellets using a Kahl pelleting press. 10% of a low molecular weight polyethylene wax (Luwax) was pre-mixed with the pre-cut PET fiber to act as a binder prior to the pelleting press process. The PET fiber pellets produced were 3 millimeters in diameter and ¼ inch to 1 inch in length. The maximum fiber pellet temperature from the pelleting press was measured to be 110° C. A pelleting rate of 300 lbs/hr was achieved.

Subsequently, the PET fiber pellets were consistently fed using a K-Tron gravimetric feeder at 60 pounds per hour with a range of feed rates between 57 and 63 pounds per hour measured at five second intervals. In comparison, unpelletized pre-cut PET fiber of ½ inch length would not discharge consistently using the same K-Tron feeder with intervals of up to 10 seconds where no fiber would discharge from the feeder.

When these PET fiber pellets were added to a polypropylene composite via extrusion compounding, the resultant molded material displayed no splintering in a drop weight impact test at room temperature, with a total energy absorbed of 5.5 foot-pounds.

Illustrative Example 2

½ inch long PET fiber of 6 denier diameter and 6 gram/denier tenacity from Minifibers Inc., was mixed with 10% Licocene 1502 polypropylene wax from Clariant or 10% Luwax A polyethylene wax from BASF. The mixing took place in a Littleford FKM 130 standard plow mixer at 80 revolutions per minute for 30 seconds. The mixture was fed into a Kahl Pelleting Press, at a hydraulic pressure of 60-90 bar with output at 300 pounds per hour. The pellets that were produced were made in diameters ranging from 3 to 8 millimeters. The die that produced these pellets had a 4:1 compression ratio. The 8 millimeter diameter pellets were alternatively made with a die having a compression ratio of 6:1. The pellets that were produced had lengths ranging from ⅛ inch to 2 inches long. The PET fibers were readily visible when the pellets were opened by hand, indicating that the fibers had not melted in the pelleting press process.

The bulk density of the pellets was 22.5 lb/cubic foot for the 8 mm diameter pellets, and 20 lb/cubic foot for the 3 mm pellets. For comparison, the ¼ inch length fiber itself had a bulk density of 14 lb/cubic foot.

An Acrison BDF1.0 loss in weight feeder was used to feed the PET fiber pellets produced in the pelleting press. When the feeder was set to dispense at 95 pounds per hour, it was found that over a period of consecutive 15 second intervals, the feed rate error (standard deviation/average rate) was approximately +−7%. In contrast, when ¼ inch length PET fibers from Minifibers were placed in the next size larger feeder of the same type from Acrison (Acrison BDF1.5), the feed rate error under the same conditions was approximately +−15%. The PET fiber pellet feed was more consistent than the free-flowing pre-cut PET fiber feed. With the pre-cut PET fiber, there were short, instantaneous periods of no fiber feed as the metering auger turned, whereas with the PET fiber pellets, there were no short, instantaneous periods of no fiber pellet feed as the metering auger turned. This exhibits one exemplary benefit of feeding PET fiber as opposed to pre-cut PET fiber to the extrusion compounding process when making fiber reinforced polypropylene based composites.

Illustrative Example 3

A Leistritz 27 mm extruder with a 40:1 length diameter ratio containing a combination of kneading and conveying elements was used to extrude the PET fiber pellets of Example 2 (comprising PET fiber—Luwax A polyethylene wax) with polypropylene powder. 16.5% PET—wax pellets was fed into the extruder along with 83.5% PP7905 polypropylene powder from ExxonMobil. The PET fiber pellets were 5 mm in diameter, and contained 10% Luwax A polyethylene wax. The mixture was fed together via two loss in weight feeders into the main feed hopper located approximately two diameters from the beginning of the extruder, and the mixture was extruded and strand pelletized into ¼ inch long pellets, ¼ inch diameter pellets using a Scheer-Bay pelletizer to produced PET fiber reinforced polypropylene composite pellets. The temperature of the extruder barrel zones was set at 120° C. across all zones in the extruder.

The PET fiber reinforced polypropylene composite pellets were then injected molded into disks to test for instrumented impact. The results were 7.3+−0.5 ft-lbs at room temperature, with no broken pieces or shards breaking off the test pieces.

Illustrative Example 4

A Coperion ZSK58 mm twin screw extruder with a 40:1 length-diameter ratio containing a combination of kneading and conveying elements was used to extrude the PET fiber pellets of Example 2 (comprising PET-Licocene 1502 polypropylene wax), PP7905 polypropylene powder, and HTP1C talc as well as other additives, such as 5% PO1020 maleic anhydride modified polypropylene from ExxonMobil Chemical and 0.20% Kemamide slip agent from Chemtura Corporation. Various loadings of the 8 mm diameter PET fiber pellets were fed into the extruder, keeping the talc level constant at 20%. The polypropylene and talc and additives were fed via the main feed hopper approximately two diameters from the beginning of the screw, while the PET fiber pellets were fed via a side stuffer located 19 diameters from the beginning of the extruder. The side stuffer (Coperion ZSB58) contained 58 mm diameter, 14 mm channel depth twin screws rotating at 400 RPM. All components were fed into the extruder via Acrison loss in weight feeders.

The extruder was operated at 400 rpm. Total production rate was 575 lbs/hr. A gear pump was also installed on the Coperion ZSK58 twin screw extruder. Barrel temperatures were held at 210° C. or less in order to keep the melt temperature low and not begin to melt or soften the PET. The extruder screw design was based on a typical design used in compounding polypropylene and filler. The first mixing zone prior to the side stuffer was designed to melt the polypropylene. After the side feeder, another series of kneading blocks were used to disperse the PET fiber from the PET fiber pellets into the polypropylene.

A Gala Model 6 underwater pelletizer was used to pelletize the PET fiber reinforced polypropylene composite. The die holes used were 4 mm in diameter. The target pellet length was 6 mm to help insure sufficiently long fibers in the final product.

In a comparative example, a Brabender loss in weight fiber feeder containing ¼ inch length, 6 denier diameter, 8 gram/denier tenacity pre-cut PET fiber from Minifibers was used to feed pre-cut PET fiber via the side stuffer. In both cases, the PET reinforced polypropylene pellets were injection molded to test for instrumented impact as well as formed into rectangular plaques (3 inches by 12 inches by ⅛" thick) to determine quality of PET fiber dispersion. Instrumented impact was measure by ASTM method referenced above. A 4" diameter disc, ⅛" thick was injection molded. A 25 lb standard hemisphere was dropped at 15 mph onto the plaque. In this case, after the impact, if all the pieces are held together by the fibers, the samples passes and the failure mode is referred to as ductile (D). If the pieces do not all hold together, the sample failure is referred to as brittle (B).

The larger rectangular injection molded plaques were observed for any PET fiber clumps on the surface of the plaque. Results are reported in the percentage of plaques that showed no surface blemishes from visible clumps of PET fiber.

The results from the testing of product made in the ZSK58 twin screw extruder for the two different trials taking place on different dates are shown in Table 1 below:

TABLE 1

| Conditions | | Trial 1 Results | Trial 2 Results |
|---|---|---|---|
| 15% Fiber, (Source: MiniFibers 6 mm fed via Brabender fiber feeder) COMPARATIVE EXAMPLE | Failure Mode (out of 5) | 5D | 5D |
| | Impact energy at −30 C. (ft-lbs) | 6.4 | 6.0 |
| | Standard Deviation (ft-lbs) | 1.7 | 1.5 |
| | Fiber Dispersion (% of plaques that are clear) | 80% | |
| 15% Fiber (i.e.16.5% pellets) (Source: 8 mm fiber pellets fed via Acrison Loss in Weight Feeder) INVENTIVE EMBODIMENT | Failure Mode (out of 5) | 5D | 5D |
| | Impact energy at −30 C. (ft-lbs) | 6.6 | 6.4 |
| | Standard Deviation (ft-lbs) | 1.0 | 1.1 |
| | Fiber Dispersion (% of plaques that are clear) | 100% | |
| 17.5% Fiber (i.e. 19.25% pellets) (Source: 8 mm fiber pellets fed via Acrison BDF1.0) INVENTIVE EMBODIMENT | Failure Mode (out of 5) | | 5D |
| | Impact energy at −30 C. (ft-lbs) | | 8.20 |
| | Standard Deviation (ft-lbs) | | 1.00 |

PET reinforced polypropylene composite samples made from PET fiber pellets exhibited comparable instrumented impact results as the PET reinforced polypropylene composite samples made from pre-cut PET fed into the extrusion compounding process (comparative example) when the final PET fiber content in the fiber reinforced polypropylene composite were equivalent. However, surprisingly, the use of the PET fiber pellets in the extrusion compounding process resulted in improved dispersion of PET fiber in the fiber reinforced polypropylene composite injection molded parts than the use of pre-cut PET fiber in the extrusion compounding process.

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A method for making fiber reinforced polypropylene composite pellets comprising:
   (a) forming synthetic organic fiber pellets by:
      i) mixing in a solid state in a plow mixer, a tumbler or a ribbon type blender a combination of pre-cut synthetic organic fiber and one or more waxes to form a fiber-wax mixture, ii) feeding the fiber-wax mixture into a pelleting press, iii) forcing the fiber-wax mixture in a solid state through a die of the pelleting press to form synthetic organic fiber strands, and iv) cutting the synthetic organic fiber strands into synthetic organic fiber pellets, (b) feeding into a compounding extruder at least 25 wt % polypropylene based polymer, from 5 to 60 wt % of synthetic organic fiber in the form of the synthetic organic fiber pellets, and from 0 to 60 wt % inorganic filler, based on the total weight of the composition;

(c) extruding the polypropylene based resin, the synthetic organic fiber pellets, and the inorganic filler through the compounding extruder to form a fiber reinforced polypropylene composite melt;

(d) cooling the fiber reinforced polypropylene composite melt to form a solid fiber reinforced polypropylene composite; and (e) pelletizing the solid fiber reinforced polypropylene composite to form fiber reinforced polypropylene composite pellets;

wherein the synthetic organic fiber pellets comprise at least 80 wt % of the pre-cut synthetic organic fiber chosen from polyalkylene terephthalates, polyalkylene naphthalates, polyamides, polyolefins, polyacrylonitrile, and combinations thereof, and from 2 to 20 wt % of the one or more waxes; and wherein an article molded from the composite pellets has a flexural modulus of at least 2.07 GPa and exhibits ductility during instrumented impact testing.

2. The method of claim 1 wherein the synthetic organic fiber pellets range from 2 mm to 12 mm in diameter.

3. The method of claim 2 wherein the synthetic organic fiber pellets range from 3 mm to 8 mm in diameter.

4. The method of claim 1 wherein the synthetic organic fiber pellets range from 3.2 to 50.8 mm in length.

5. The method of claim 1 wherein the one or more waxes are chosen from polyolefin waxes, polytetrafluroethylene waxes, ethylene acrylic acid waxes, Fischer-Tropsch waxes, paraffin waxes, Carnauba waxes, Montan waxes and combinations thereof.

6. The method of claim 5 wherein the polyolefin waxes are chosen from polyethylene, polypropylene, polybutene-1, copolymers of polyethylene/polypropylene/polybutene-1, terpolymers of polyethylene/polypropylene/polybutene-1, and combinations thereof.

7. The method of claim 6 wherein the polyolefin waxes are polyethylene, polypropylene or combinations thereof.

8. The method of claim 1 wherein the synthetic organic fiber is polyethylene terephthalate.

9. The method of claim 1 wherein the synthetic organic fiber in the synthetic organic fiber pellets range from 3.2 mm to 25.4 mm in length and from 5 μm to 100 μm in diameter.

10. The method of claim 1 including from 8 to 12 wt % of the one or more waxes.

11. The method of claim 1 wherein the synthetic organic fiber pellets further include from 1 to 25 wt % of a colorant fiber chosen from cellulosic fiber, acrylic fiber, polyamide type fiber or polyester type fiber.

12. The method of claim 1 wherein the synthetic organic fiber pellets are fed from a feeder including a feeder hopper, one or more conditioning augers/agitators within the feeder hopper, one or more metering augers below the feeder hopper within a housing, and a means for controlling the speed of the conditioning augers/agitators and metering augers.

13. The method of claim 12 wherein the feeder controls synthetic organic fiber pellet output rate via volumetric output or loss-in-weight of the feeder hopper using closed loop feedback control to the speed of the one or more metering augers.

14. The method of claim 12 wherein the feeder feeds the fiber pellets into the compounding extruder at the extruder hopper or at a downstream feed port in the extruder.

15. The method of claim 1 wherein the polypropylene based polymer is chosen from polypropylene homopolymers, propylene-ethylene random copolymers, propylene-butene-1 random copolymers, propylene-hexene-1 random copolymers, propylene-octene-1 random copolymers, propylene-α-olefin random copolymers, propylene impact copolymers, ethylene-propylene-butene-1 terpolymers, and combinations thereof.

16. The method of claim 15 wherein the polypropylene based polymer is polypropylene homopolymer with a melt flow rate of from 20 to 2000 g/10 minutes.

17. The method of claim 1 wherein the polypropylene based polymer further comprises from 0.1 wt % to less than 10 wt % of a polypropylene based polymer modified with a grafting agent, wherein said grafting agent is chosen from acrylic acid, methacrylic acid, maleic acid, itaconic acid, fumaric acid or esters thereof, maleic anhydride, itaconic anhydride, and combinations thereof.

18. The method of claim 1 further comprising feeding into the compounding extruder from 0.01 to 0.1 wt % lubricant, based on the total weight of the composition, wherein the lubricant is chosen from silicon oil, silicon gum, fatty amide, paraffin oil, paraffin wax, and ester oil.

19. The method of claim 1 wherein the inorganic filler is chosen from talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof.

20. The method of claim 19 wherein the inorganic filler is talc or wollastonite.

21. The method of claim 1 further comprising feeding into the compounding extruder from 0.1 to 2.5 wt %, based on the total weight of the composition, colorant fiber chosen from cellulosic fiber, acrylic fiber, polyamide type fiber or polyester type fiber, and wherein the article molded from the composite pellets exhibits a cloth-like appearance.

22. The method of claim 1 wherein an article molded from the composite pellets has a flexural modulus of at least 2.76 GPa.

23. The method of claim 1 wherein the compounding extruder comprises barrel temperature control set points of less than or equal to 215° C.

24. The method of claim 1 wherein the article is an automotive part, a household appliance part, or a boat hull.

25. The method of claim 24 wherein the automotive part is chosen from bumpers, front end modules, aesthetic trim parts, body panels, under body parts, under hood parts, door cores, steering wheel covers, head liner panels, dashboard panels, interior door trim panels, package trays, seat backs, pillar trim cover panels, and under-dashboard panels.

26. The method of claim 1 wherein the pre-cut synthetic organic fiber is randomly distributed within the synthetic organic fiber pellets.

* * * * *